United States Patent [19]

Schneider

[11] 4,059,096

[45] Nov. 22, 1977

[54] UNITIZED SERVING BASE WITH IMPERFORATE PELLET

[75] Inventor: Irwin Schneider, Chicago, Ill.

[73] Assignee: Imperial Arts Corporation, Elk Grove Village, Ill.

[21] Appl. No.: 687,769

[22] Filed: May 19, 1976

[51] Int. Cl.² .............................................. F24H 7/06
[52] U.S. Cl. ..................................... 126/375; 126/246
[58] Field of Search ................................ 126/375, 246

[56] References Cited

U.S. PATENT DOCUMENTS

| 1,049,385 | 1/1913 | Mohrenwitz | 126/246 |
| 3,734,077 | 5/1973 | Murdough et al. | 126/375 |
| 3,837,330 | 9/1974 | Lanigan et al. | 126/375 |

Primary Examiner—John J. Camby
Assistant Examiner—Larry I. Schwartz
Attorney, Agent, or Firm—Hill, Gross, Simpson, Van Santen, Steadman, Chiara & Simpson

[57] ABSTRACT

An imperforate, highly heat-absorbent pellet is enclosed between vertically-spaced upper and lower wall members which are sealed together only at their outer peripheries. A layer of thermal insulation is interposed between the pellet and the lower wall. The pellet is maintained in a centered position in the serving base primarily by a peripheral, upwardly-inclined, thin flange about the pellet which contacts an upwardly-inclined side portion of the upper wall. A raised center portion of the upper wall has a wall descending to a depressed ring just inwardly of the side portion; the pellet has a corresponding downward step contacting the descending wall and assisting in aligning the parts. The pellet and server base thereby are made rigid against deformation and rendered substantially non-burstable upon heating.

3 Claims, 3 Drawing Figures

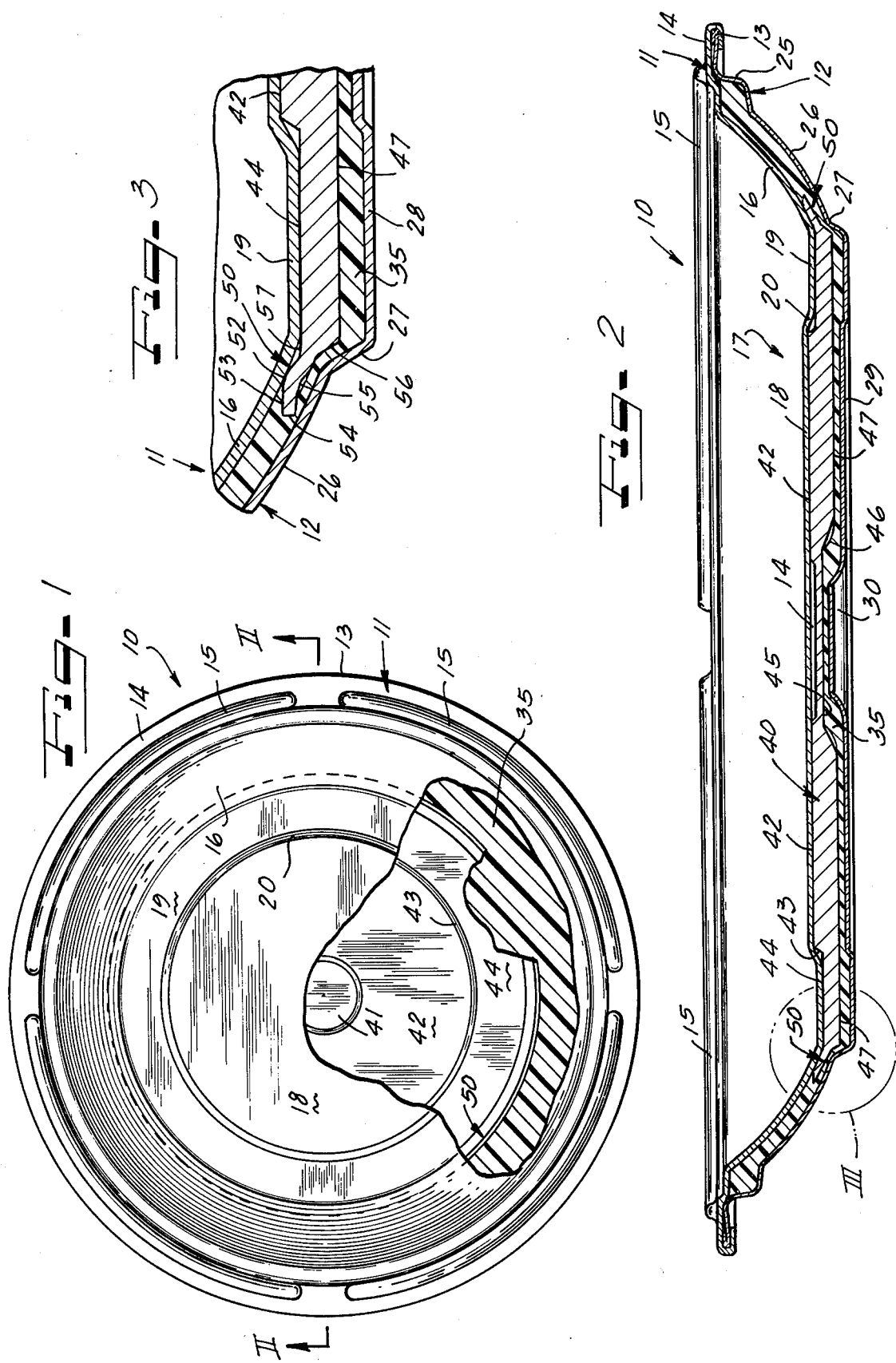

UNITIZED SERVING BASE WITH IMPERFORATE PELLET

BACKGROUND OF THE INVENTION

1. Field of the Invention

The present invention relates to devices for keeping food warm until served and eaten at a location remote from a food preparation center, as in a hospital.

2. The Prior Art

U.S. Pat. No. 3,837,330 discloses a heat-retaining server wherein a heat retaining pellet is attached firmly to the upper wall by a central support extending through a central aperture in the pellet. The pellet has a thick peripheral flange which extends downwardly to a lower shoulder which engages a rim of the lower wall of the server to reduce deformation. The top of the pellet is generally flat except having a step just inward of a peripheral flange engaging a lower portion of an inclined side portion of the upper wall. The server has no insulation between the pellet and the lower wall. The pellet is said to occupy at least 75 percent of the space within the server between the upper and lower walls to prevent deformation due to increase of pressure within the sealed server.

U.S. Pat. No. 3,734,077 discloses a generally rectangular food server having an apertured heat-retaining pellet. The upper and lower walls contact one another through depression through the central aperture, but the portions are not weldled together as in prior art patents such as U.S. Pat. No. 3,557,774.

SUMMARY OF THE INVENTION

A food-warming serving dish comprises a shaped upper wall having a radially outward periphery, an outwardly-upwardly inclined side portion just inwardly of the periphery, and a generally flat central portion. A lower wall is sealingly joined to the upper wall about the periphery therof and is spaced vertically from the upper wall throughout the side and central portions. A layer of heat-insulating material is placed between the upper and lower walls. An imperforate unitized pellet of high heat-absorbency is placed between the insulating material and the upper wall. The pellet has a thin, raised peripheral flange about its perimeter which contacts an undersurface of the inclined side portion of the upper wall, the flange centering the pellet in the base without its being rigidly affixed thereto. The pellet further has a raised central portion to underlie and contact a raised central portion of the upper wall, the parts contacting along a radially-outwardly downward step in the pellet to assist in centering the pellet upon the upper wall of the base. The lower surface of the pellet is substantially flat and has no contact with the lower wall.

BRIEF DESCRIPTION OF THE DRAWINGS

FIG. 1 is a top plan view, partially broken away, of the serving base of the present invention.

FIG. 2 is a side sectional view on line II-II of FIG. 1.

FIG. 3 is an enlarged view of the peripheral flange of the pellet, on line III-III of FIG. 2.

DESCRIPTION OF THE PREFERRED EMBODIMENT

A food warming serving base is shown in plan view in FIG. 1 at 10, and in side sectional view along a diameter in FIG. 2. The serving base 10 comprises an upper wall 11 and a lower wall 12 which are joined together at an outer, peripheral edge 13. The walls 11 and 12 are, in accordance with the principles of the invention, spaced apart over all their surfaces, except at the sealed joint 13 therebetween. The upper wall 11 has a rim portion 14 carrying segmented stiffening ribs 15 raised from the rim 14. Inwardly from the rim 14 is an inclined side portion 16 extending downwardly to a base center portion 17. The center portion 17 is generally flat, having a horizontally-extending center table portion 18 surrounded by a relatively broad, depressed ring 19 slightly below the level of the table 18. An inclined wall 20 joins the table 18 to the ring 19.

The lower wall 12 of the serving base 10 extends from the sealed edge 13 downwardly through a stiffening step 25 and then generally parallel to the inclined side portion 16 of the upper wall 11, forming a side wall 26. The wall 26 has a lower step 27 which bounds a lower ring 28 upon which the serving base 10 may rest on a flat surface. Radially inwardly of the ring 28, the lower wall 12 is recessed first to an annular depression 29 and then to a central recess 30. The step 27 and the recesses 29 and 30 increase the rigidity of the lower wall 12, permit the wall to be made of a thinner material, and facilitate stacking of the servers.

Overlying substantially the entire inner surface of the lower wall 12 is a mat of insulating material 35 such as a glass fiber material. The material 35 is compressible and serves both to insulate thermally the upper and lower walls 11, 12 and to bear against a lower surface of a solid, heat-retaining pellet 40 placed thereatop.

The pellet 40 is constructed of a heavy material such as metal having a relatively high heat capacity and being relatively rigid. The pellet 40 is imperforate over its entire width, in accordance with the principles of the invention, and nowhere contacts the lower wall 12. An upper surface of the pellet 40 has a central recess 41 in the center thereof and a broad, annular surface 42 which intimately contacts the center table portion 18 of the upper wall 11. The upper surface 42 extends radially outwardly to a circular step 43 which abuts against the undersurface of the inclined wall 20 of the upper wall 11. A second annular surface portion 44 of the pellet 40 underlies the pressed ring 19 of the upper wall 11.

The undersurface of the pellet 40 has a central recess 45 which overlies the recess 30 in the bottom wall 12 of base 10. A downwardly-convex annular surface 46 connects the recess 45 to a lowermost, flat surface 47 of the pellet 40. The surface 47 extends radially outwardly of the server 10 to a point radially inwardly of the step 27 in the lower wall 12.

In accordance with the further principles of the invention, the pellet 40 has formed on an outer periphery thereof, joining the upper surface 44 with the lower surface 47 thereof, a retention flange 50 shown in detail in FIG. 3. The flange 50 is relatively thin in the vertical direction and extends into the space between the side walls 16 and 26 of the upper wall and the lower wall 12, respectively. The upper surface of the flange 50 merges with the upper wall 44 preferably through a slight annular indentation 51. An upper surface of the flange 50 curves upwardly and outwardly, contacting the undersurface of the side wall 16 at least along a circular line 52. The flange 50 may also be formed with its upper surface contacting the upper wall along a broad band, as in FIG. 2. A generally flat upper surface 53 is formed at about the same height as the annular surface 42 of the center portion of the pellet 40. An outer edge 54 of the flange 50 is generally vertical. The undersurface of the flange 50 curves from the outer edge 54 of the flange 50, spaced above the inner surface of the side wall 26 and the step 27 in the lower wall 12 as at 55, and rejoins the lower surface 47 through a step 56 which runs generally parallel to step 27.

It has been found that forming a serving base with the features specified provides a rigid and substantially nondeformable serving base which is considerably less expensive to construct in materials and in machining and assembly operations than devices known to the prior art. Overheating of the serving base, as may happen upon heating equipment control failure of inattentiveness to equipment operation, will cause the solid pellet 40 to expand thermally and generally uniformly. Apparently the provision of a solid center to the pellet 40, between the upper surface 41 and the lower surface 45, provides a compressive force to surrounding portions of the pellet 40 which assists in maintaining a uniform shape in the pellet 40. That is, in prior art devices having center apertures to retain the pellet to the structure of the base, the lack of material in the center of the pellet contributes to deformation of the structure upon thermal expansion. Expansion of air between the upper and lower walls 11, 12 and about the pellet 12 is resisted in the present structure by the shapes of the upper and lower walls.

Although various minor modifications may be suggested by those versed in the art, it should be understood that I wish to embody within the scope of the patent warranted hereon all such embodiments as reasonably and properly come within the scope of my contribution to the art.

I claim as my invention:

1. A food-warming serving base comprising:
   a shaped upper wall having a radially outward periphery, and outwardly-upwardly inclined side portion just inwardly thereof, and a generally flat central recessed portion;
   a lower wall sealingly joined to said upper wall about said periphery of said base and spaced vertically from said upper wall at said side and central portions thereof;
   a layer of heat-insulating material placed between said upper and lower walls;
   a solid, radially-continuous pellet of high heat-absorbency between said insulating material and said upper wall to contact said upper wall and release heat thereto; and
   a thin, raised peripheral flange about said pellet adapted to contact an undersurface of said inclined side portion of said upper wall adjacent said central portion of said wall, said flange centering said pellet in said base upon said central portion.

2. The serving base of claim 1, wherein said central portion of said upper wall has a vertically raised center table surrounded by a relatively depressed ring and an inclined wall therebetween, and said pellet has a raised central portion uderlying and intimately contacting said raised center table and a radially-outwardly downward step to abut said inclined wall at a line along an undersurface thereof, the step and wall assisting said peripheral flange of the pellet in centering the pellet with respect to the base.

3. A serving base as defined in claim 1, wherein the lower surface of the pellet is substantially flat and has no contact with the lower wall of the base.

* * * * *